United States Patent
Zimmer (10) Patent No.: US 7,150,065 B2
(45) Date of Patent: Dec. 19, 2006

(54) WIPER ARM, WIPER BLADE AND WIPER DEVICE, ESPECIALLY FOR THE PANES OF A MOTOR VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 10/089,360

(22) PCT Filed: Jul. 21, 2001

(86) PCT No.: PCT/DE01/02779

§ 371 (c)(1),
(2), (4) Date: Jul. 17, 2002

(87) PCT Pub. No.: WO02/09986

PCT Pub. Date: Feb. 7, 2002

(65) Prior Publication Data
US 2003/0028990 A1  Feb. 13, 2003

(30) Foreign Application Priority Data

Jul. 27, 2000 (DE) .................... 100 36 569
Jan. 16, 2001 (DE) .................... 101 01 655
Jun. 23, 2001 (DE) .................... 101 30 381

(51) Int. Cl.
*B60S 1/34* (2006.01)
*B60S 1/38* (2006.01)
*B60S 1/46* (2006.01)

(52) U.S. Cl. .................. 15/250.04; 15/250.351; 15/250.43; 15/250.201

(58) Field of Classification Search .......... 15/250.201, 15/250.351, 250.352, 250.43, 250.44, 250.04, 15/250.451
See application file for complete search history.

(56) References Cited

U.S. PATENT DOCUMENTS

| | | | | | |
|---|---|---|---|---|---|
| 2,910,715 | A | * | 11/1959 | Ohrt ...................... | 15/250.04 |
| 3,088,155 | A | * | 5/1963 | Smithers ................ | 15/250.201 |
| 3,673,631 | A | * | 7/1972 | Yamadai et al. ....... | 15/250.201 |
| 3,854,161 | A | * | 12/1974 | Benson .................. | 15/250.04 |
| 3,862,465 | A | | 1/1975 | Ito ......................... | 15/250.201 |
| 4,766,636 | A | * | 8/1988 | Shinpo ................... | 15/250.201 |
| 5,509,166 | A | * | 4/1996 | Wagner et al. ......... | 15/250.44 |
| 5,661,870 | A | * | 9/1997 | Eustache et al. ....... | 15/250.04 |
| 5,893,192 | A | * | 4/1999 | Lee ........................ | 15/250.201 |
| 6,108,857 | A | * | 8/2000 | Lee ........................ | 15/250.201 |

FOREIGN PATENT DOCUMENTS

| | | | |
|---|---|---|---|
| DE | 3139444 | * | 4/1983 |
| DE | 4314414 | * | 11/1994 |
| EP | 0 343 869 | | 11/1989 |
| FR | 2 632 897 | | 12/1989 |
| FR | 2 785 248 | | 5/2000 |
| JP | 63-71462 | * | 3/1988 |
| JP | 5-193452 | * | 8/1993 |

* cited by examiner

*Primary Examiner*—Gary K. Graham
(74) *Attorney, Agent, or Firm*—Kenyon & Kenyon LLP (57) ABSTRACT

A wiper device includes a wiper arm that is mounted in driveable fashion and that bears a wiper blade, the wiper arm being formed by an essentially U-shaped profile part that surrounds the wiper blade at least partially. The front limb, which in the installed position points essentially in the direction of travel of the vehicle, forms a spoiler, and at least one air outlet opening is situated on the additional limbs. An air guide element, configured to pass through the profile part, is arranged at least in the inner area of the U-shaped profile part.

15 Claims, 9 Drawing Sheets

WIPER ARM, WIPER BLADE AND WIPER DEVICE, ESPECIALLY FOR THE PANES OF A MOTOR VEHICLE

FIELD OF THE INVENTION

The present invention relates to a wiper device, in particular for windshields of motor vehicles.

BACKGROUND INFORMATION

Conventional wiper devices may have a wiper arm that is formed by a U-shaped profile part. Here the limb that, in the installed position, points in the direction of travel of the vehicle may form an integrated spoiler, and air outlet openings situated on the additional limb and/or on the back. Such a wiper arm is, for example, described in French Published Patent No. 2 632 897.

However, the spoiler and the air outlet opening may not prevent the occurrence, at higher vehicle travel speeds, of lifting forces that counteract the pressure force with which the wiper blade, fastened on the wiper arm, may be pressed onto the windshield.

SUMMARY OF THE INVENTION

A wiper device according to the present invention involves air guide elements that may be situated in the interior of the profile part, e.g. along the width of the wiper arm, to produce a course of the flow of the travel wind, which may effectively increase the pressure force of the wiper arm at high speeds and at the same time eliminate disturbing wind noises, without causing an optically disturbing effect and without significantly increasing the cost of the wiper arm.

If the air outlet openings are situated in the rear limb, facing away from the spoiler, of the U-shaped profile part, then these openings may be seen only from the interior of the vehicle, and may nonetheless be made sufficiently large to produce a sufficient downforce, and thus a sufficient pressure force.

If an air guide element protrudes beyond the limb of the U-shaped profile part, sufficient air may enter into the wiper arm for the production of the downforce. For example, the air guide elements may be situated in such a manner that they form a funnel-type inlet in the area of the lower spoiler edge.

In addition, the protruding air guide element may have a soft rubber lip, in order to prevent damage or noise in case of a possible contact between the vehicle windshield and the air guide element. In this manner, a particularly small spacing from the vehicle windshield may be achieved, thus potentially achieving a more desirable course of the flow.

If the air guide elements are situated in such a manner that the flow-through cross-section in the inflow area is smaller than it is in the outflow area, a suction effect may be achieved through the travel wind.

This effect may be further strengthened if, in the installed position, the air guide elements are closer to the windshield in the inflow area than in the outflow area.

A desirable course of the flow may be achieved if the air guide elements are situated in such a manner that the air flowing through is accelerated, so that a slight suction effect arises in the direction of the windshield. This airfoil-type effect may increase the wiping result significantly, particularly at high speeds.

In addition, at least one air outlet opening may be situated in the center limb of the U-shaped profile part, because in this manner the flow cross-section in the outflow area may be further increased.

If an air outlet opening is situated in the limb facing away from the spoiler, and another one is situated in the center limb, then almost any course of the flow may be achieved inside the U-shaped profile, and thus inside the wiper arm.

If, in addition, the air guide elements are fashioned as an injection-molded part, they may be manufactured economically, and they may increase the weight of the wiper device only marginally. In addition, these injection-molded parts may also be replaced easily in case of destruction.

The air guide elements may be clipped into the profile part, in order to enable completion of a rapid installation and rapid exchange, if for example damage has occurred.

The air guide element may be glued into the profile part, in order to obtain a positively locking, smooth connection, and in this manner to avoid the development of disturbing noise.

The air guide element may have a projection for the guiding of the wiper blade, through which the relative position of the wiper blade to the air guide element may be maintained.

The wiper blade may be fashioned as a flat-beamed wiper blade. The overall constructive height between the wiper arm, the spoiler and the wiper blade may be reduced to a minimum in this manner, because an expensive clip construction that may undesirably affect the air flow may not be required between wiper blade and profile part.

In addition, a funnel-type or double-funnel-type channel may arise between the air guide elements, in order to achieve an optimal course of the flow. In the case of a double-funnel-type channel, the air inlet openings and the air outlet openings may be larger than the center of the channel.

The wiper arm according to the present invention may achieve a desirable course of flow, in particular at high flow speeds, via the situation of an air guide element in the interior of the U-shaped profile part.

At least one air guide element may be borne by the wiper blade itself, and may be fastened thereto. In this manner, the flow may strike the wiper blade itself and produce an additional pressure force that presses the wiper blade onto the windshield.

The profile part may have an air flow opening in the area of its front limb, in which an air guide element borne by the wiper blade may be received. In this manner, the spoiler of the wiper blade/wiper arm combination may be formed equally by the wiper blade and by the wiper arm, resulting in a more uniform distribution of pressure force.

The air guide elements borne by the wiper blade may terminate approximately flush with the front limb, so that an essentially flat spoiler surface results.

In order to increase stability, in particular against torsional flexing, a plurality of air flow openings may be provided along the longitudinal extension of the wiper arm. In this manner, webs may arise between the air flow openings, which improve the rigidity of the wiper arm.

Nozzles may be provided in the interior of the profile part for the exit of cleaning fluid. Larger, e.g. heatable, nozzles may be arranged in particular in the area of the rear limb, in which the nozzles disturb only slightly the flow of air through the air guide elements positioned in front of them.

A wiper blade according to the present invention may achieve desirable air flow characteristics by having the back of the blade bear at least one air guide element that works together with an upper air guide element situated on or in the wiper blade. In particular, due to the direct air flow on the wiper blade, not only may this blade be pressed against the windshield indirectly via the wiper arm, but also the wiper blade itself may be so pressed.

In this context, the lower air guide element, borne by the back of the blade, may be able to pass through the profile part of the wiper arm, in particular through its front limb. In this manner, it may be possible to achieve a flat spoiler upper surface on the front limb of the profile part, and nonetheless to have air flow immediately against the wiper blade.

The wiper blade may bear a plurality of air guide elements along a longitudinal extension, since in this manner the stability of the wiper arm may not be limited.

DETAILED DESCRIPTION

Figure 1:
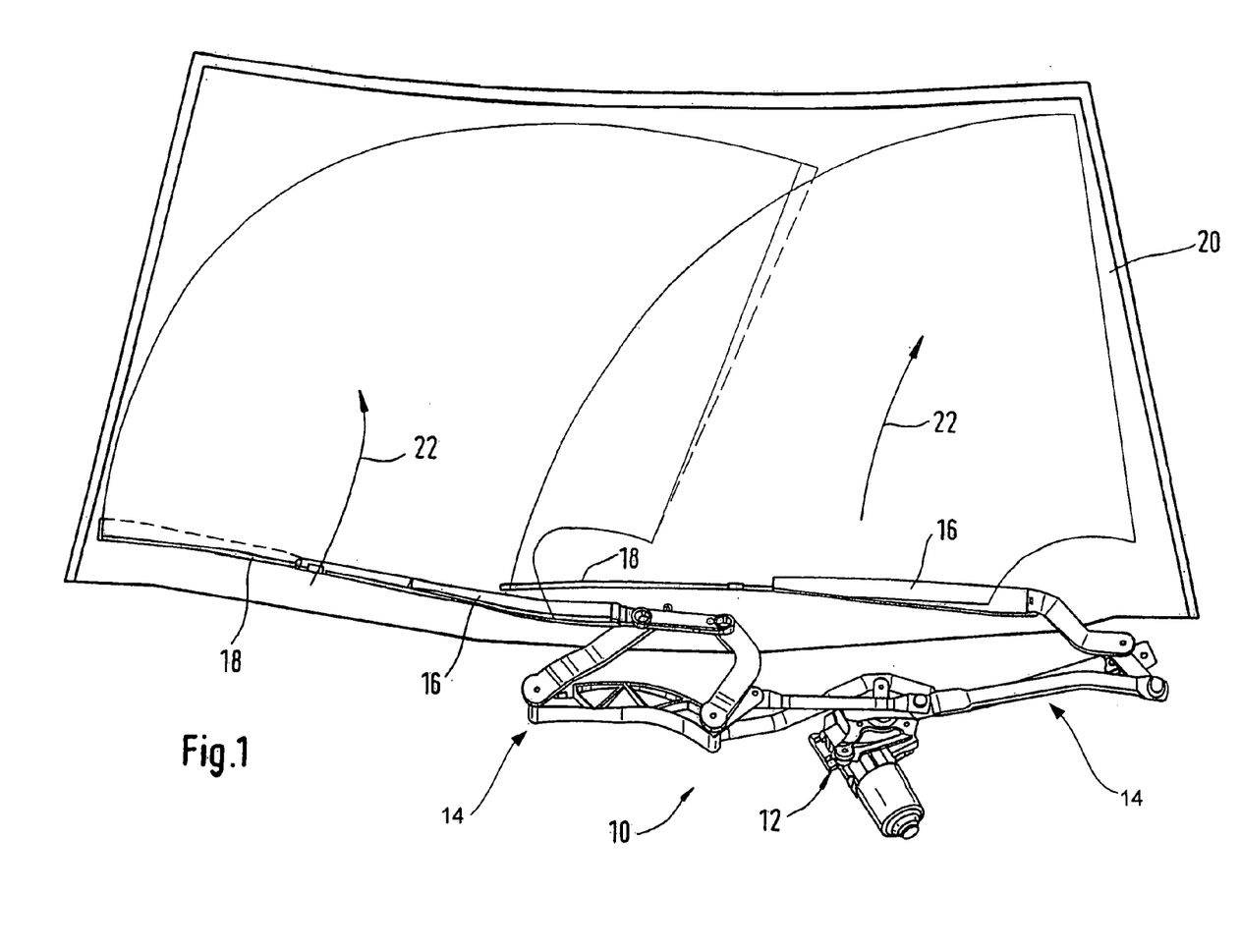
FIG. 1 shows a wiper device according to the present invention in a perspective view.

FIG. 1 shows a wiper device 10 in a perspective view. This device has a motor 12 that drives, via a rod 14, two wiper arms 16, each bearing at its end a wiper blade 18. Wiper blade 18 is fastened on wiper arm 16, approximately parallel to the longitudinal extension thereof, and is partially surrounded by wiper arm 16. Of course, it may also be possible for wiper blade 18 to be surrounded completely by wiper arm 16. Here, wiper blade 18 is fashioned as a flat-beamed wiper blade.

As a part of a motor vehicle, wiper device 10 is fastened to the body thereof, and causes wiper blade 18 to slide over windshield 20. During travel operation of the motor vehicle, the travel wind causes a flow of air, indicated by flow arrows 22.

Figure 2:
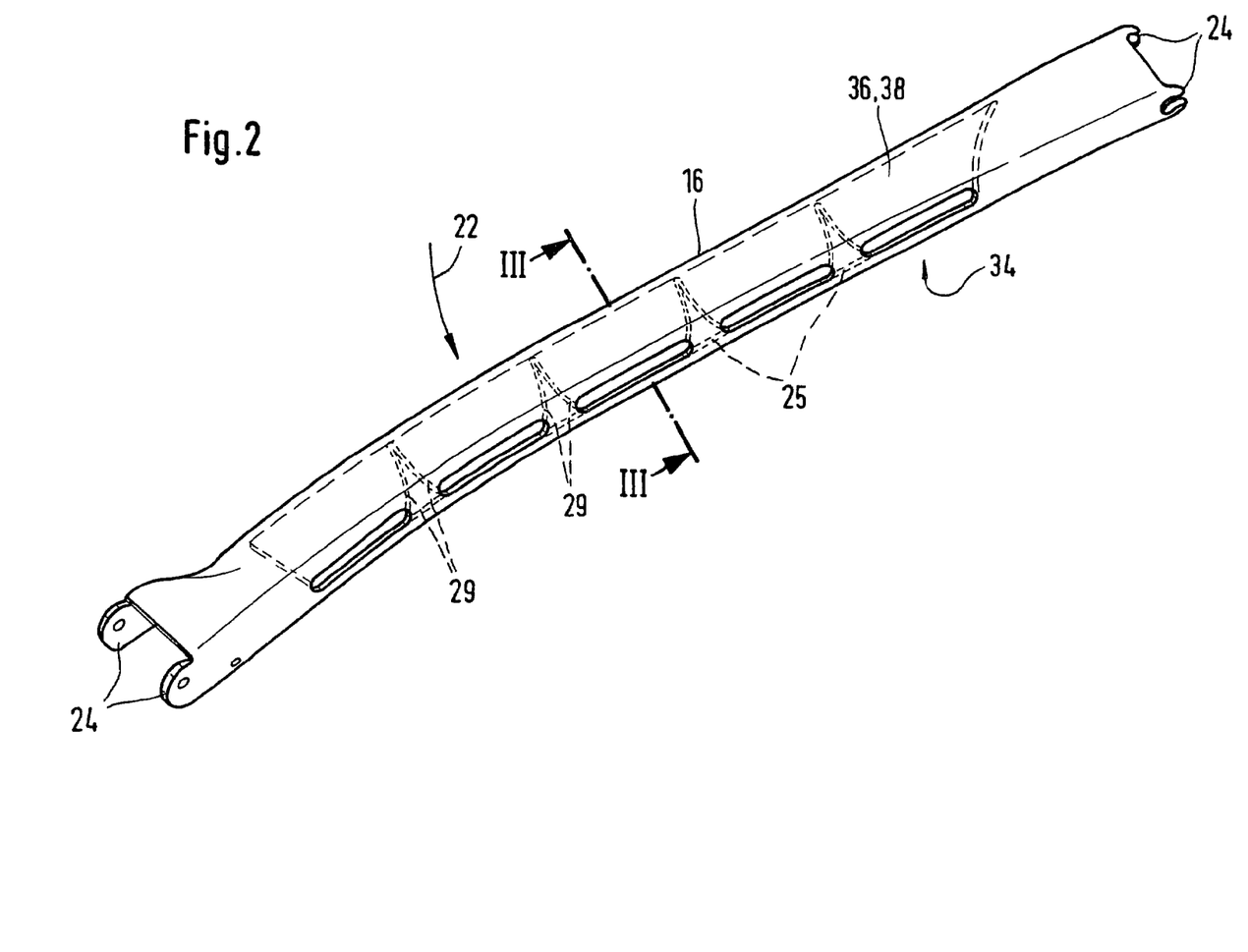
FIG. 2 shows a wiper arm of a wiper device according to the present invention in a perspective view.

FIG. 2 shows a wiper arm 16 of a wiper device 10 according to the present invention, in a perspective view. The air flow direction is here again represented by flow arrow 22. Wiper arm 16 is essentially made up of a U-shaped profile part 26 that is chamfered on the side facing the flow of air to form a spoiler. At the ends of its longitudinal extension, fastening elements 24, in particular hooks and/or eyes, are arranged for fastening to rod 14 and to wiper blade 18. On the side facing away from the flow of air, air outlet openings 40 are situated such that they are separated from one another by webs 25. In an inner area 34 of profile part 26, air guide elements 36, 38 are clipped in as a one-piece injection-molded part, which is represented in the drawings by broken lines. This injection-molded part is shown more precisely in cross-section in FIGS. 3 to 8.

Along its longitudinal extension, side walls 29 are situated between upper and lower air guide element 36, 38; these walls continue individual air outlet openings 40 of profile part 26 in the interior of air guide elements 36, 38. On the side facing the flow, these side walls 29 are brought together in pair-by-pair fashion, and may prevent flow turbulences at webs 25 situated between air outlet openings 40. In addition, they may increase the stability of the injection-molded part.

Figure 3:
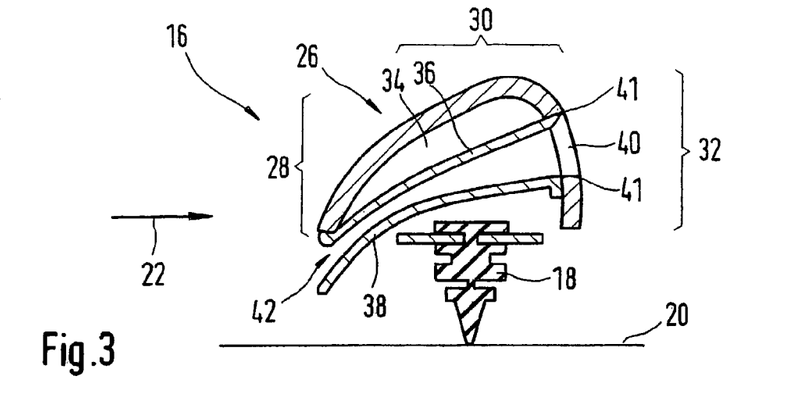
FIGS. 3 to 8 show sections through wiper arms of a wiper device according to the present invention in different variations.

FIG. 3 shows a cross-section through the wiper arm of FIG. 2. Profile part 26 of wiper arm 16 has a back 30, from which the two limbs extend laterally. The limb facing the flow of air is designated in the following as front limb 28, and the limb facing away from the flow of air is designated rear limb 32. Here as well, the flow of air is indicated by flow arrow 22.

In the interior area 34 of U-shaped profile part 26, air guide elements 36, 38 are situated, which partially also extend beyond inner area 34 of profile part 26. Underneath profile part 26 a wiper blade 18 is shown, fashioned as a flat-beamed wiper blade. Air from inner area 34 of profile part 26 may flow out through air outlet openings 40, situated in its limb 32 facing away from the flow.

In this context, upper air guide element 36 is situated in such a way that it extends from the lower edge of front limb 28, facing windshield 20, to the upper edge of air outlet opening 40. Lower air guide element 38 projects from the lower edge of air outlet opening 40, over wiper blade 18 and beyond profile part 26, in the manner of an airfoil, so that a funnel-type air inlet opening 42 arises. In this manner a nozzle effect arises between air inlet opening 42 and air outlet opening 40, which may strengthen the pressure force with which wiper arm 16 presses wiper blade 18 onto windshield 20. At their end, air guide elements 36, 38 adjoin the air outlet openings in flush fashion, so that as little turbulence may be formed in this area as possible.

Figure 4:
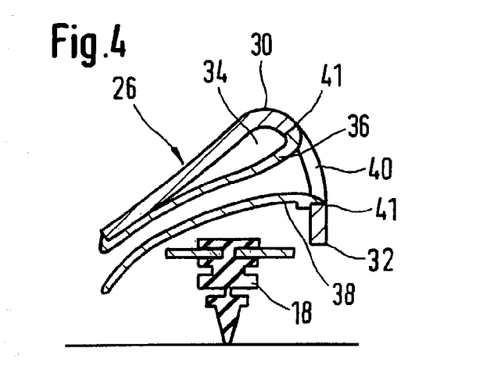

As shown in FIG. 4, air guide elements 36, 38 may also be fashioned such that they form a smooth, rounded-off transition with additional limbs 30, 32 in the area of the edges of air outlet opening 40.

Front limb 28, which forms the spoiler, may be shaped in convex fashion or, as shown here, in concave fashion.

Figure 5:
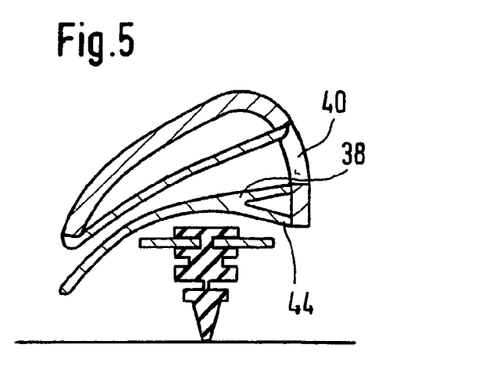

FIG. 5 shows how lower air guide element 38 has a flow element 44 that extends from the lower side of lower air guide element 38 to the lower edge of rear limb 32, in order to avoid undesirable flow characteristics such as turbulences in this area, without having an adverse effect on the flow to air outlet opening 40. Of course, lower air guide element 38 may also be fashioned at its rear side in such a manner that no hollow space arises between flow element 44 and air outlet opening 40.

Figure 6:
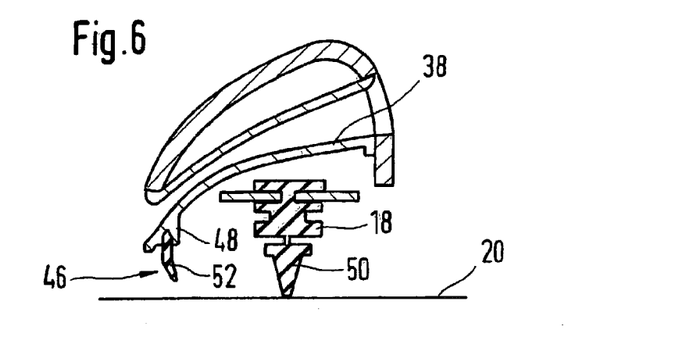

In FIG. 6, lower air guide element 38 is lengthened at its side facing the flow by a soft rubber lip 46. Here this rubber lip 46 is injection-molded onto the lower air guide element over a projection 48, e.g. in a multicomponent injection-molding method. Here rubber lip 46 is oriented approximately perpendicular to windshield 20 and approximately parallel to the mid-axis of wiper blade 18, but it may also have a knee 52, and its cross-section may taper downwards.

Figure 7A:
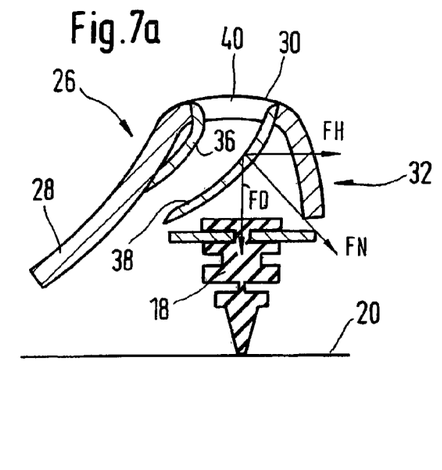

FIG. 7a shows a variation of a wiper arm according to the present invention. Here U-shaped profile part 26 has, on its side facing the flow, a concave curvature, the lower edge of front limb 28 lying more closely on windshield 20 than the end, facing the flow, of lower air guide element 38 and the lower edge of rear limb 32. Here, air outlet opening 40 is situated in back 30, and the two air guide elements 36, 38 are correspondingly guided in the direction of back 30.

In addition, in FIG. 7a a parallelogram of forces is shown as it arises through interior air guide elements (36, 38). Due to the acceleration, air that flows through air guide elements (36, 38), which are fashioned as funnel-type channels, exerts a normal force (FN) perpendicular to the surface of lower air guide element (38). This is decomposed into a pressure force (FD) that presses wiper blade (18) in the direction of windshield (20), and a horizontal force (FH) that pushes wiper blade (18) over windshield (20).

Figure 7B:
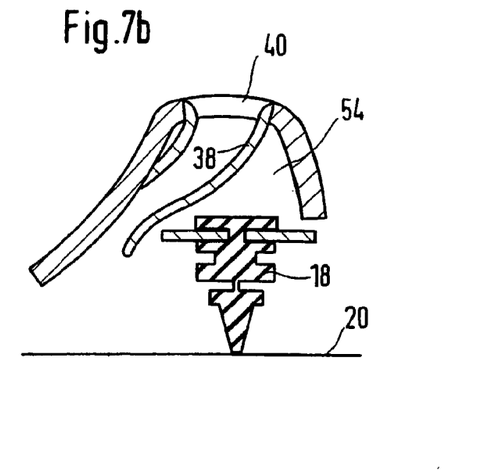

As shown in FIG. 7b, lower air guide element 38 in inner area 34 of profile part 26 may be situated such that wiper blade 18 is partially covered in terms of flow, so that only a small amount of air flows through area 54 over wiper blade 18.

Figure 8A:
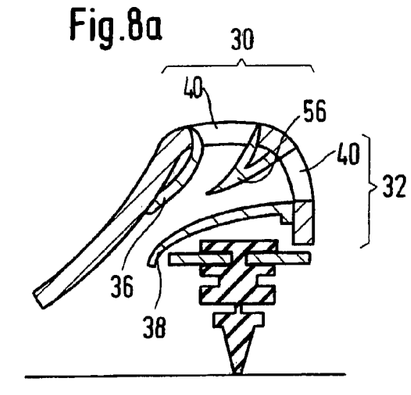

In FIG. 8a, a variation of the exemplary embodiment from FIG. 7a is shown. Besides air outlet opening 40 in back 30, an additional air outlet opening 40 is situated in rear limb 32. In order to prevent eddies between upper and lower air guide element 36, 38 in the area of air outlet openings 40, a center wedge 56 is situated between these, ensuring a laminar course of the flow in the direction of the two air outlet openings 40. This center wedge 56 is fashioned as an approximately triangular wedge, whose foot extends from the upper edge of rear air outlet opening 40 up to the rear edge of upper air outlet opening 40 situated in back 30, and terminates flush with these edges.

Figure 8B:
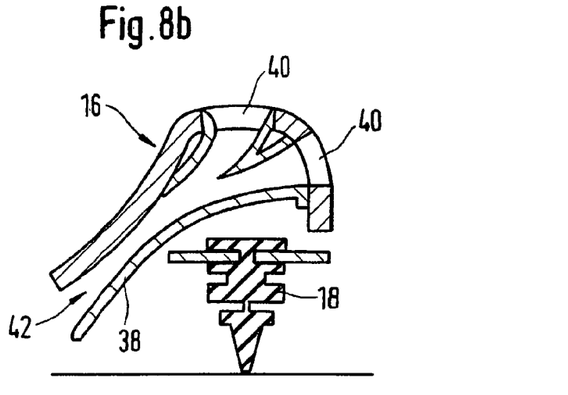

FIG. 8b shows a further variation. As in FIG. 8a, wiper arm 16 has two air outlet openings 40, but, as is also the case in FIG. 3, lower air guide element 38 protrudes beyond the edge of front limb 28, so that wiper blade 18 is covered almost completely by lower air guide element 38, and forms a funnel-type air inlet opening 42.

Figure 9:
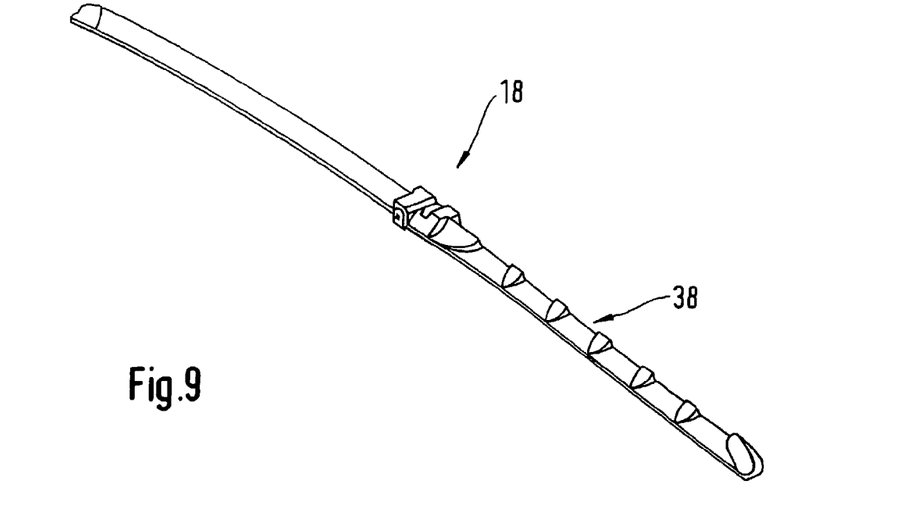
FIG. 9 shows a wiper blade having air guide elements in a perspective view.

FIG. 9 shows a wiper blade 18 according to the present invention in a perspective view. Here lower air guide elements 38 are fastened not to wiper arm 16, but rather to wiper blade 18.

As already shown in FIG. 8b, wiper blade 18 is essentially made up of a wiper blade element 58 whose blade back 60 is reinforced by a spring strip 62. Lower air guide elements 38 are fastened, e.g. clipped on, to spring strip 62. These guide elements may in principle also be fastened to wiper blade element 58 in the region of blade back 60, or may be formed in one piece from wiper blade element 58 in the extruder. Moreover, spring strip 62 may be omitted. This may for example be achieved through a corresponding rubber mixture in the area of blade back 60 of wiper blade element 58.

Figure 10:
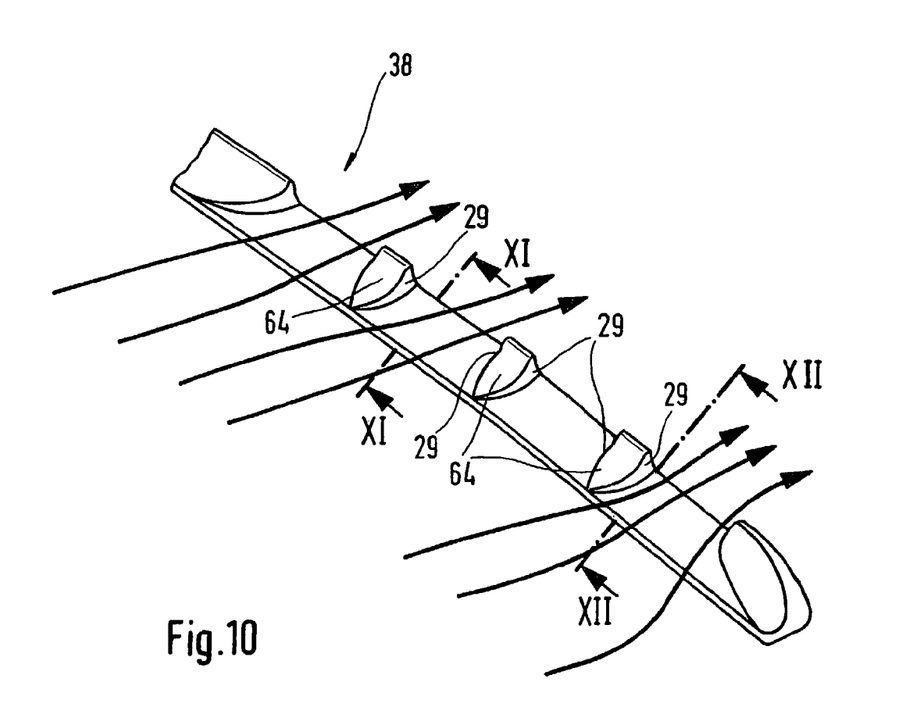
FIG. 10 shows a detail of the air guide element from FIG. 9.

In FIG. 10, lower air guide element 38 may be seen as it is clipped on to spring strip 62. This air guide element 38 is made up of a plate, on which wedge-shaped projections 64 that come to a point against the direction of flow are situated. Sidewalls 29 of wedge-shaped projections 64 are formed in such a manner that an optimal course of the flow of the entering air is achieved in the direction of air outlet openings 40 of wiper arm 60.

Figure 11:
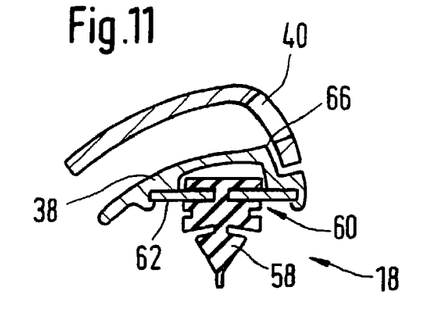
FIGS. 11 to 16 show sections through a wiper arm with wiper blade.

FIG. 11 shows a cross-section through such an air guide element 38 having a wiper arm 16. Air guide element 38 is clipped on to spring strip 62 in the region of blade back 60 of wiper blade element 58 by clip elements 62. Of course, air guide element 38 may also be fastened to blade back 60 by gluing, locking, or ultrasound imprinting. The section shown here is situated in the area of air outlet opening 40, as shown in FIG. 10.

On the edge of air outlet opening 40 facing the wiper blade, air guide element 38 has a deflecting edge 66 in order to improve the course of the flow. Through this, the deflection of the flow of the travel wind occurs at wiper blade 18, and not at wiper arm 16, so that a lifting off of wiper blade 18 may be avoided.

Figure 12:
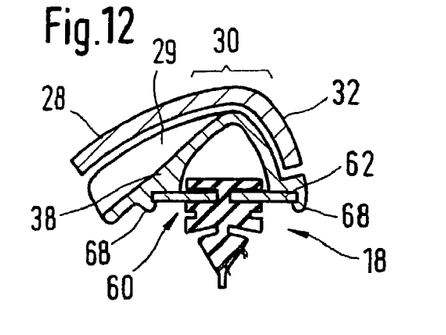

In FIG. 12, the same cross-section is shown as in FIG. 11, but in an area in which wiper arm 18 has no air outlet opening 40. Air guide element 38 here extends up to back 30, and divides the air stream through sidewalls 29 into two parts, so that the flow may escape through air outlet openings 40.

Figure 13:
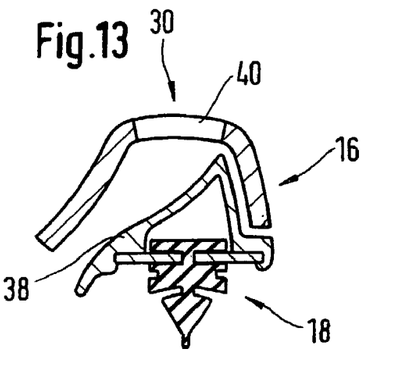

FIG. 13 shows a variation of the system from FIG. 11. Air outlet opening 40 is located in the area of back 30 of wiper arm 16, and lower air guide element 38 is shaped in such a manner that the air stream of the travel wind is deflected in the direction of air outlet opening 40 in back 30.

Figure 14:
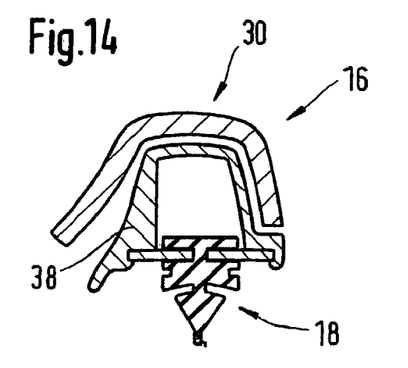

Corresponding thereto, in FIG. 14 the area of the wiper arm without air outlet opening 40 is shown. Here, air guide element 38 is essentially box-shaped, and seals the interior of wiper arm 16.

Figure 15:
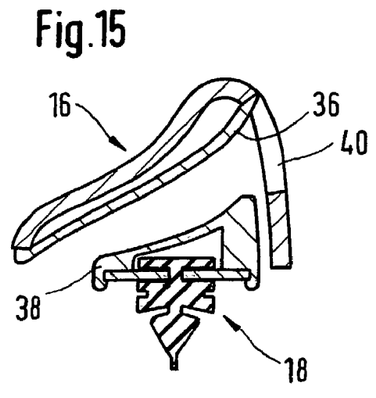

FIG. 15 shows a development of the system shown in FIG. 11. In addition to lower air guide element 38, fastened to wiper blade 18, here an upper air guide element 36 is fastened in wiper arm 16. This may for example be realized through a clip connection. In this manner, the air stream is deflected in the direction of air outlet opening 40 in a better manner, lower in turbulence.

Figure 16:
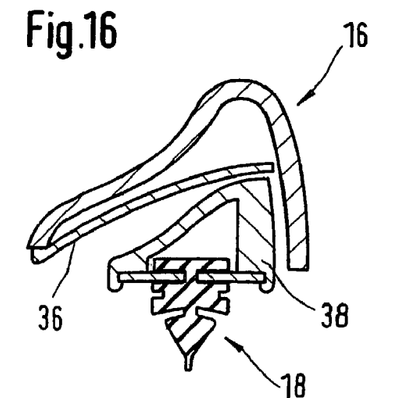

In FIG. 16, wiper arm 16, having upper air guide element 36, is shown for the area in which no air outlet opening 40 is provided. Upper air guide element 38 is displaced upward, in the direction of wiper blade 18, and almost touches the upper edge of lower air guide element 36, which is raised at this point, and divides the flow towards the sides.

Figure 17:
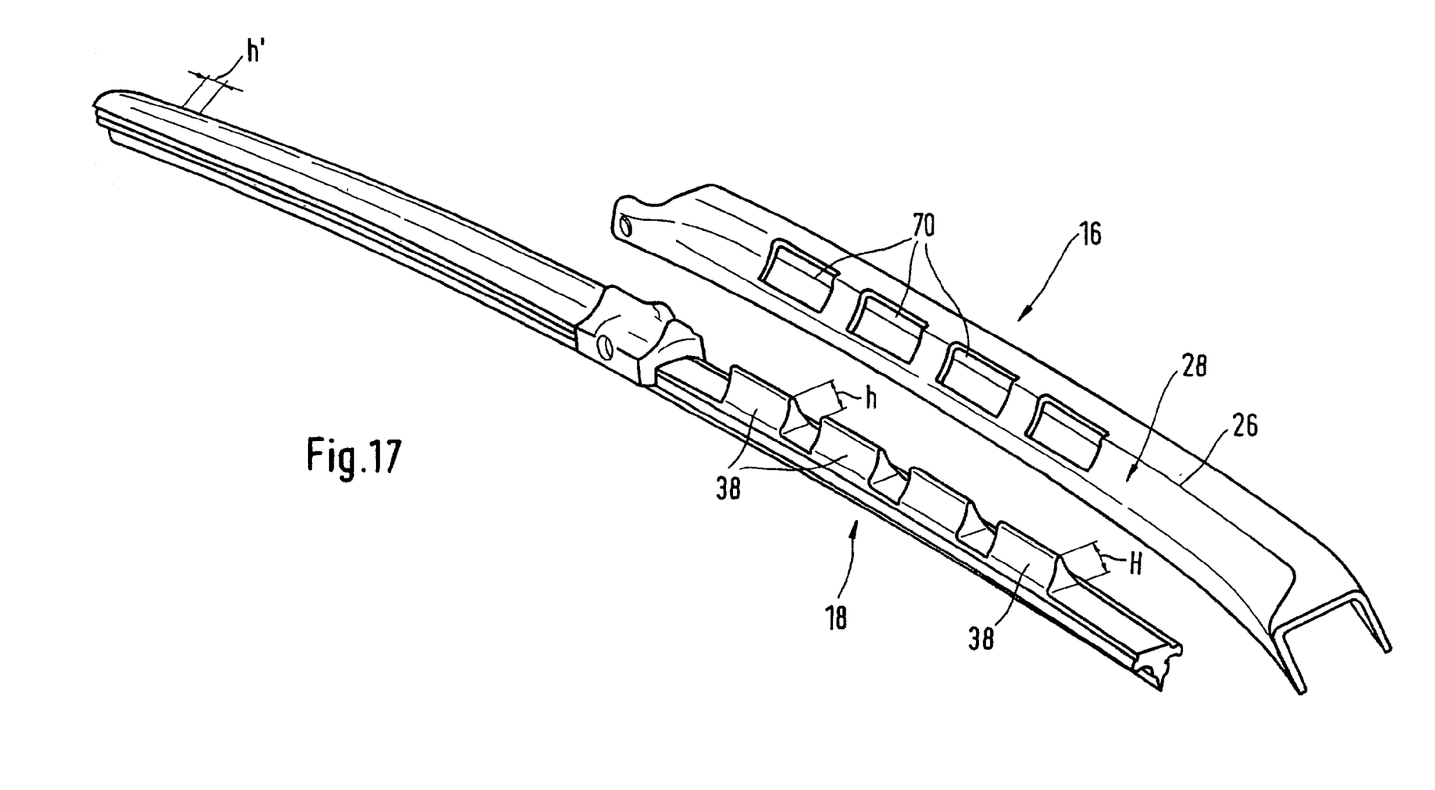
FIG. 17 shows an inventive wiper arm having a wiper blade, in a perspective view.

FIG. 17 shows a further variation of inventive wiper arm 16, having a wiper blade 18, in a perspective view.

Wiper arm 16 is essentially made up of an essentially U-shaped profile part 26, to which wiper blade 18 may be coupled. Wiper blade 18 has, in the area of its blade back 60, air guide elements 38 that are fashioned such that they penetrate into the interior of profile part 26 when wiper arm 16 is connected with wiper blade 18. In order to increase the pressure force with which wiper blade 18 is pressed onto windshield 20, front limb 28 of profile part 26 has air flow openings 70, into which air guide elements 38 of wiper blade 18 penetrate in the assembled position, and forms an essentially smooth surface with front limb 28. This is shown in FIG. 18.

In this context, the height of lower air guide elements 38 fastened to wiper blade 18 is determined by the geometry of wiper arm 16. Typically, the interior height H in the area of the end of wiper blade 18, covered by wiper arm 16, is greater than the exterior height h in the area of the fastening of wiper blade 18 to wiper arm 16, or even edge height h' at the end, facing away from wiper arm 16, of wiper blade 18.

Figure 18:
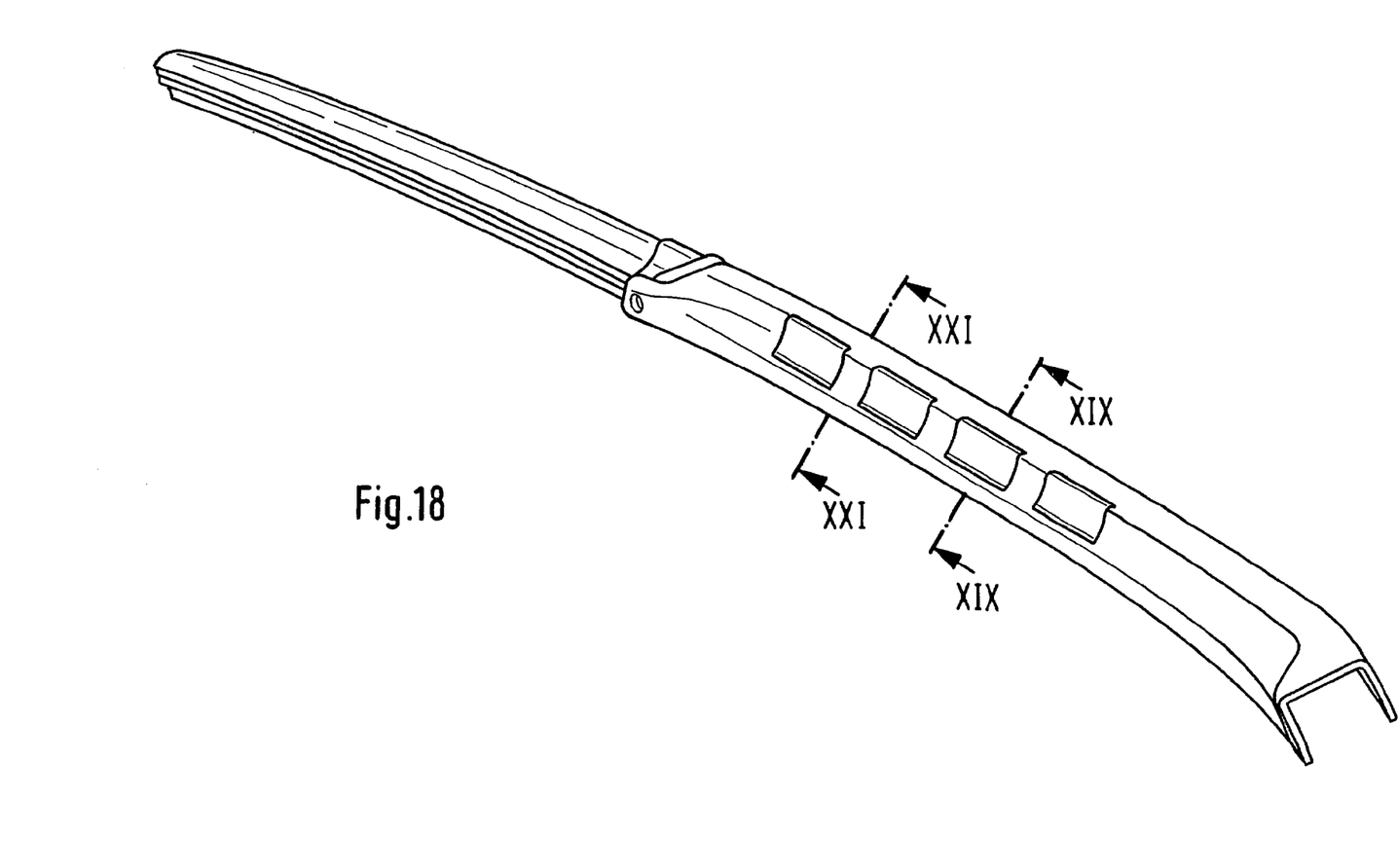
FIG. 18 shows wiper arm and wiper blade according to FIG. 17 after assembly.
Figure 19:
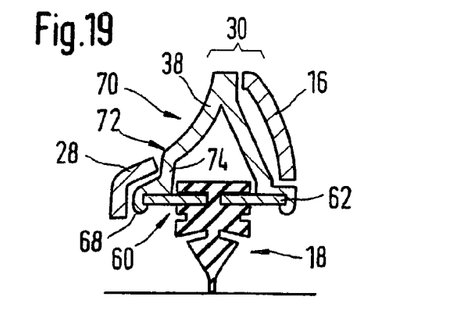
FIGS. 19 to 21 show cross-sections through a wiper arm with wiper blade according to FIG. 18.

FIG. 19 shows a section through wiper arm 16 having air guide element 38 from FIG. 18. Wiper arm 16 has air flow opening 70 in the area of its front limb 28. Air guide element 38, fastened in the area of blade back 60, enters into this air flow opening 70, so that an essentially smooth surface results.

For this purpose, lower air guide element 38 essentially has an inverted V shape. On its side facing the flow, air guide element 38 has a knee 72 to which a stilt 74 is connected. Clip element 68, which connects air guide element 38 with spring strip 62 of blade back 60, is then situated on this stilt.

Through stilt 74, there results a smooth curve between front limb 28 and the air flow surface of air guide element 38.

Figure 20:
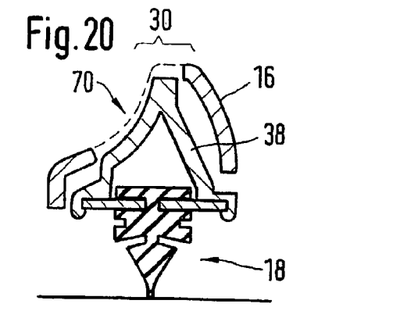

Wiper blade 18 may be moved in the vertical direction inside profile part 26 of wiper arm 16 in order to compensate different geometries of windshield 20. In order to enable this lifting movement, air flow opening 70 of wiper arm 16 extends beyond back 30 of profile part 26. This is again shown in FIG. 20.

Figure 21:
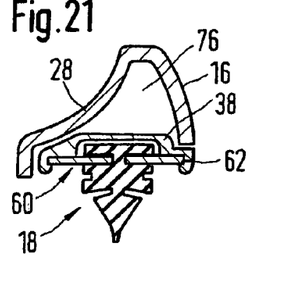
Figure 21A:
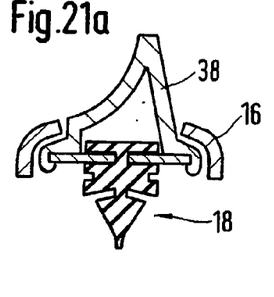
Figure 21B:
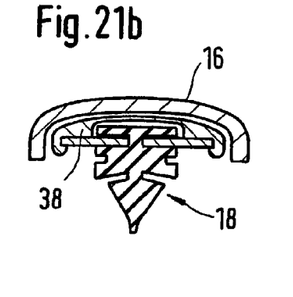

FIGS. 21*a* and 21*b* show a variation of the present invention. Wiper arm 16 may also be of flat construction in the areas of stability, between air flow openings 70, and in cross-section may extend approximately parallel, or with only a slight convex curvature, to blade back 60 (FIG. 21*b*). In this embodiment, air guide elements 38 then protrude from wiper arm 16 along the longitudinal extension of wiper arm 16, in comb-type or tooth-type fashion (FIG. 21*a*).

In FIG. 21, the area of wiper arm 16 is shown in which no air flow opening 70 is provided. In this area, air guide element 38 is fashioned only in degenerate form, i.e. only as a plate that is situated approximately parallel to spring strip 60 and that functions only to aid the stability of the system.

In this area, there results a hollow space 76 inside the wiper arm that is suitable for the situation of nozzles 78 through which cleaning fluid may be sprayed onto windshield 20. This is shown in FIG. 22.

Figure 22:
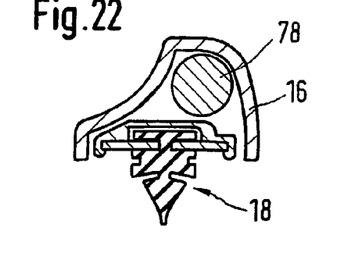
FIGS. 22 to 25 show cross-sections through a wiper arm with wiper blade according to FIG. 18, but with nozzles and various channels.
Figure 23:
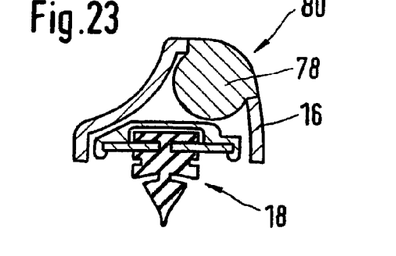
Figure 24:
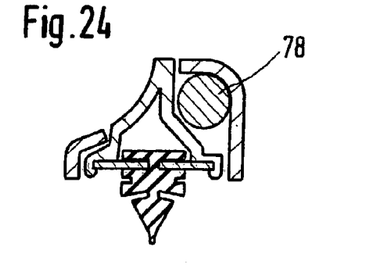
Figure 25:
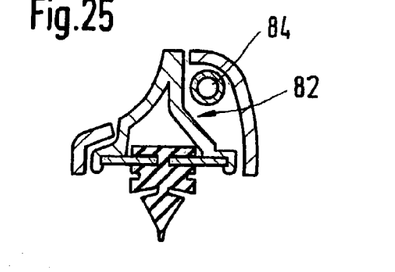

Here, as indicated in FIG. 22, nozzles 78 may either spray directly out of wiper arm 16, or, as shown in FIG. 23, may spray onto windshield 20 through a spray opening 80. In the areas in which air guide element 38 passes through air flow opening 70, this guide element may also be fashioned, by an additional knee 82, in such a manner that a cleaning fluid channel 84 may be situated here as well. A flow supply line for a nozzle 78, a cleaning fluid channel heating unit, or a nozzle 78 itself, may be arranged here, as shown in FIGS. 24 and 25. In particular, nozzles 78 having a non-return valve, may have a large constructive shape.

What is claimed is:

1. A wiper device for a windshield of a motor vehicle, comprising:
   an essentially U-shaped profile part arranged to form a wiper arm mounted in a driveable fashion and configured to couple with a wiper blade, the U-shaped profile part including a front limb, a rear limb, a back, at least one air outlet opening, and at least one air guide element, the front limb arranged to form a spoiler pointing in a forward direction of the vehicle when installed, and the at least one air guide element arranged in an interior area of the U-shaped profile part, wherein the U-shaped profile part further includes an air inlet opening arranged such that a flow cross-section of the air inlet opening is smaller than a flow cross-section of the at least one air outlet opening.

2. The wiper device according to claim 1, wherein the at least one air outlet opening is arranged in the rear limb and configured to face away from the spoiler.

3. The wiper device according to claim 1, wherein the at least one air guide element protrudes beyond a plane formed by an edge of at least one of the front limb and the rear limb.

4. The wiper device according to claim 3, wherein the at least one air guide element includes a soft rubber lip on a protruding area thereof along a longitudinal extension of the at least one air guide element.

5. The wiper device according to claim 1, wherein when installed, the at least one air guide element is arranged closer to a surface to be wiped in an area facing a direction of flow than in an area facing away from the direction of flow.

6. The wiper device according to claim 1, wherein the at least one air guide element is arranged such that air flowing through the U-shaped profile part is accelerated.

7. The wiper device according to claim 1, wherein the at least one air outlet opening is arranged in the back of the U-shaped profile part.

8. The wiper device according to claim 1, wherein the at least one air outlet opening includes at least one air outlet opening arranged in the rear limb and at least one additional air outlet opening arranged in the back.

9. The wiper device according to claim 1, wherein the at least one air guide element is configured as an injection-molded part.

10. The wiper device according to claim 1, wherein the at least one air guide element is one of clipped and glued into the U-shaped profile part.

11. The wiper device according to claim 1, wherein the at least one air guide element is configured to form a funnel-type channel.

12. A wiper arm for a wiper device, comprising:
    at least one essentially U-shaped profile part configured to couple with a wiper blade; and at least one air guide element arranged in an inner area of the at least one U-shaped profile part, wherein at least one of the at least one air guide element is borne by the wiper blade, and wherein the at least one U-shaped profile part includes at least one air flow opening in an area of a front limb of the at least one U-shaped profile part, the at least one air flow opening configured to receive the at least one air guide element borne by the wiper blade.

13. The wiper arm according to claim 12, wherein at least one of the at least one air guide element is configured to terminate approximately flush with the front limb to form an essentially flat surface.

14. The wiper arm according to claim 12, wherein the at least one U-shaped profile part includes a plurality of air flow openings along a longitudinal extension of the at least one U-shaped profile part.

15. The wiper arm according to claim 12, further comprising:
    nozzles for an exit of a cleaning fluid, the nozzles arranged in an area of a rear limb of the at least one U-shaped profile part.

* * * * *